(No Model.)

A. C. FERGUSON.
MATRIX MAKING AND STEREOTYPING.

No. 539,253. Patented May 14, 1895.

Witnesses
Inventor
Arthur C. Ferguson
By Foster Freeman
Attorneys

UNITED STATES PATENT OFFICE.

ARTHUR C. FERGUSON, OF SARATOGA SPRINGS, NEW YORK.

MATRIX-MAKING AND STEREOTYPING.

SPECIFICATION forming part of Letters Patent No. 539,253, dated May 14, 1895.

Application filed May 10, 1894. Serial No. 510,730. (No model.)

*To all whom it may concern:*

Be it known that I, ARTHUR C. FERGUSON, a citizen of the United States, residing at Saratoga Springs, in the county of Saratoga and State of New York, have invented certain new and useful Improvements in Matrix-Making and Stereotyping, of which the following is a specification.

My invention relates to improvements in the art of forming matrices and producing stereotypes for printing purposes, and it has for its object to improve and simplify the manner of producing matrices and stereotypes, so that they can be cheaply and quickly produced in good condition for use, and my invention consists in the various features, substantially as hereinafter more particularly set forth.

Figure 1:
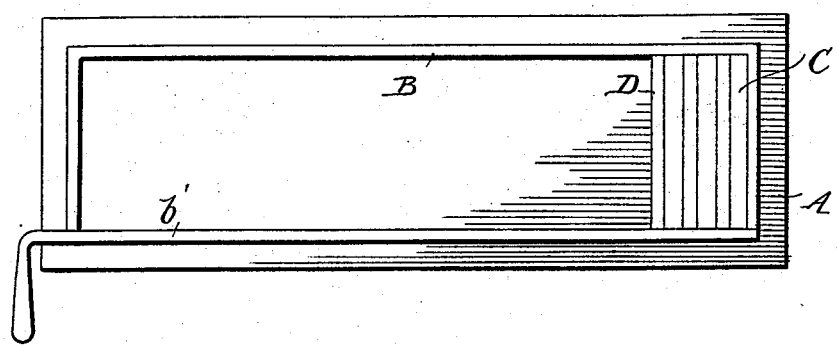
Figure 2:
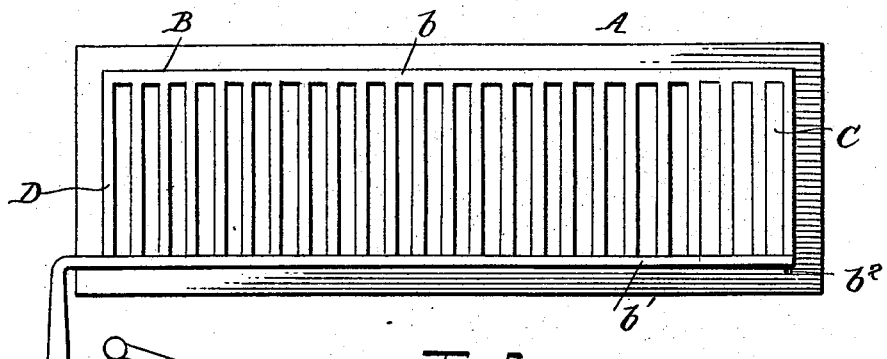
Figure 3:
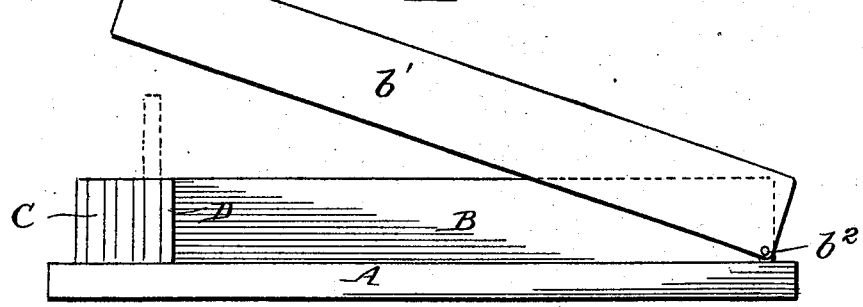
Figure 4:
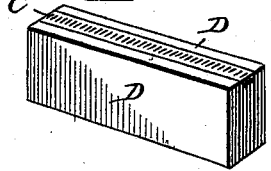

In the accompanying drawings, Figure 1 is a plan view of a support for the slugs and guards. Fig. 2 is a similar view of a modified support. Fig. 3 is a side view of the same, and Fig. 4 is a perspective view of a slug and its supporting-guides.

Without attempting to set forth the whole prior state of the art, and to point out the objections or difficulties which have arisen in carrying out the prior processes and methods, it is sufficient to state that it is one of the objects of my present invention to prepare a matrix preferably in the manner hereinafter set forth, and to use such matrix or matrices assembled together, from which to form a stereotype plate directly, which is ready for use in printing, and to thus avoid the delay and expense in preparing the stereotype plate or plates.

One of the features of my invention consists in the use of what I have termed "slugs," made of some suitable material which is relatively soft enough to readily receive the impress from dies, but hard enough and of such consistency as to form a clean-cut impression, which shall be an exact fac-simile of the dies. Thus, I may make use of some soft metal, some composition of matter, or any other suitable material, which possesses these requisites, and I form this material into what I have termed slugs, which consist of bars of proper length, thickness and depth, preferably of a length corresponding to the width of a column of matter to be printed, and of a width sufficient to receive the impress from the dies, and form a clear and perfect matrix, and these slugs are to be impressed by the dies, or other suitable mechanism, in any suitable way, preferably by means of some of the well-known forms of type-impressing machines, in which the dies are assembled in any desired order by a suitable mechanism, and are adjusted or justified to form a line of type, and are then together pressed upon the face of the slug to form the matrix, thus completing a line at one impression although, of course, any other well-known means of forming the matrix may be used, that not being an essential of my invention. These slugs, supposing for instance, they are made of soft metal, are cast or otherwise formed in quantities with flat upper faces, and are arranged to be supplied to the matrix-forming devices in any suitable way, and it will be seen that instead of casting the slugs separately, one for each line of dies after it has been set up and adjusted, I may form my slugs at any time or at any place, and simply feed them or otherwise bring them into co-operative relation with the dies in whatever kind of a machine or device is used, so that each slug is impressed by the die or dies successively.

One serious disadvantage in forming matrix-lines resides in the fact that when the die or dies are pressed upon the molding surface to form the matrix, the metal is displaced and is forced to flow in such a way that it is liable to distort or injure the next preceding line of matrices, rendering the matrices imperfect, and not true copies of the dies, and it has been practically impossible heretofore to form such lines or matrices without injuring and distorting, to a greater or less extent, the adjacent lines, and in order to overcome this difficulty, one feature of my invention consists in using separate slugs to form the matrix-line, and to support the sides of the slugs between guards, which will prevent this distortion and objectionable flow of the metal when the dies are forming the matrices. These guards are preferably made of metal or some similar material, which is harder than the material of the slugs, and they are of such dimensions as to fit the sides of the slug and be practically level with its upper or molding surface, and serve to prevent the material of the matrix being distorted or flowing in an objectionable way, while being impressed. In other words I first assemble the blank slugs and their adjacent intermediate guards in a frame of the proper size and proportions, and when this is done I impress the upper surfaces of the slugs by means of dies in any preferred way so as to form matrix lines, and immediately after such impressions or lines are formed I raise or remove the intermediate guards of hard metal from between the slugs and reassemble or gather the latter closely together into the required form for producing directly therefrom the stereotype or impression plate.

As the matrix-line is made of some soft material, which generally has a relatively low melting-point, below that of the ordinary stereotype metal, it is necessary to provide some means which will prevent the fusion of the matrix-line or lines when they are assembled together to form a column, page, or other portion or body, from which the stereotype is made, and in order to prevent this, I coat the molding surface of the slugs with some material which will not interfere with the forming of the matrices, and their perfect sharpness and outline, corresponding to the dies, but which will prevent the molten stereotype metal from fusing or injuring the matrix-lines, and I have found that asbestos-paint constitutes a good material for this purpose, and I apply a relatively thin coating of this paint to the slugs before they are impressed by the dies, and I find that it in no way interferes with the formation of a perfect and satisfactory matrix and does prevent fusion in the subsequent stereotyping process.

Other features of my invention relate to the details of construction of a device for holding the slugs between the guards while they are being impressed by the dies, in such a manner that they may be properly supported and separated, and one or more may be removed for the purposes of correction or otherwise, without disturbing the others, and subsequently all the matrix-lines may be assembled to form a column, or page, or other make-up "form" from which the stereotype is to be made.

With these general statements in regard to my invention, I will now specifically set forth the embodiments thereof illustrated in the accompanying drawings, and it will be understood that the devices shown are typical only, and may be varied in detail to comply with any specific requirements or application of my invention.

A suitable base A, is provided, upon which are supported the slugs, and this base, which is here represented as a flat platform, may vary and accommodate itself to any particular form of matrix-making machines employed, that is, it is intended to be arranged as a part of a matrix-making machine in which the dies are set up and impressed upon the slugs, and of course, it will vary to suit the requirements of any particular case. Mounted upon this base is a frame B, which supports and holds a number of slugs C, and these slugs are separated from each other by the guards D, of harder material, which as before intimated, are arranged so that their upper faces practically coincide with the molding face of the slugs, and prevent the flow or distortion of the metal of the slug being impressed to form the matrix-line or any of the adjacent matrix-lines. These guards D, may be separate pieces, as shown in Fig. 1, or as is preferred in some instances, they may form part of the frame B, as indicated in Fig. 2, where they are secured at one end or cast integral with one side $b$, of the frame B, while the other side $b'$, of the frame is hinged or connected to one portion of the frame, as the end $b^2$ so that it can be raised, as indicated in Fig. 3, to remove any one or more of the matrix-lines, if for instance, it is unsatisfactory in any respect, or it is desirable to remove it for other reasons.

When a sufficient number of matrix-lines are finished, they may all be removed from the frame, either by lifting the frame therefrom, or lifting them from the frame, and the matrix-lines may be arranged or assembled to make a "form" from which the stereotype plate may be made in the usual way.

I have not deemed it necessary to illustrate the formation of the stereotype plate, or any means therefor, as any well-known stereotype mold may be used which is adapted for the purpose. The slugs are coated on their faces with asbestos-paint, or other equivalent heat-resisting coating, as is indicated at $c$, Fig. 4.

It will thus be seen that by my improvement, I avoid much of the delay and expense heretofore incident to the formation of stereotype plates, as well as many of the difficulties arising in the preparation of the matrix-lines, and it will be seen that I prepare a suitable number of slugs in advance, and these slugs are made of some material sufficiently soft to receive the impression from the dies, and still preserve the contour and sharpness of the impression, and they are coated with some heat-resisting material, so that when they are assembled after being impressed, the stereotype can be formed therefrom without difficulty.

It will also be seen that the slugs are supported by the guards on each side, preventing distortion or injury to the line being impressed, or any adjacent line, and in this way I avoid many of the difficulties heretofore inherent in the formation of matrix-lines.

It is obvious that when ordinary stereotype metal is used, the matrix-lines must be protected from fusion, especially when they are of a material which has a relatively low melting-point. When, however, a stereotype material is used which has a melting-point relatively the same or less, than that of the matrix-lines, the heat-resisting coating may be omitted.

With this statement of my invention it will be seen that I am not limited to the precise details of construction and arrangement of parts set forth, as these may be varied by those skilled in the art to suit the requirements of any particular case.

What I claim is—

1. The combination with a frame, of a series of slugs of soft material, and a series of removable guards of hard material arranged with relation to the slugs to protect them from distortion when being impressed, substantially as described.

2. The combination with a frame having guards secured thereto to prevent distortion of the slugs when being impressed, of a series of slugs arranged between the guards, and a hinged section enabling the removal of the guards and reassembling of the slugs, substantially as shown and for the purpose set forth.

In testimony whereof I have signed my name to this specification in the presence of two subscribing witnesses.

ARTHUR C. FERGUSON.

Witnesses:
F. L. FREEMAN,
ALLE N. DOBSON.